March 15, 1932.  M. B. BULGER  1,849,171
SNOW SHOVEL
Filed March 7, 1931
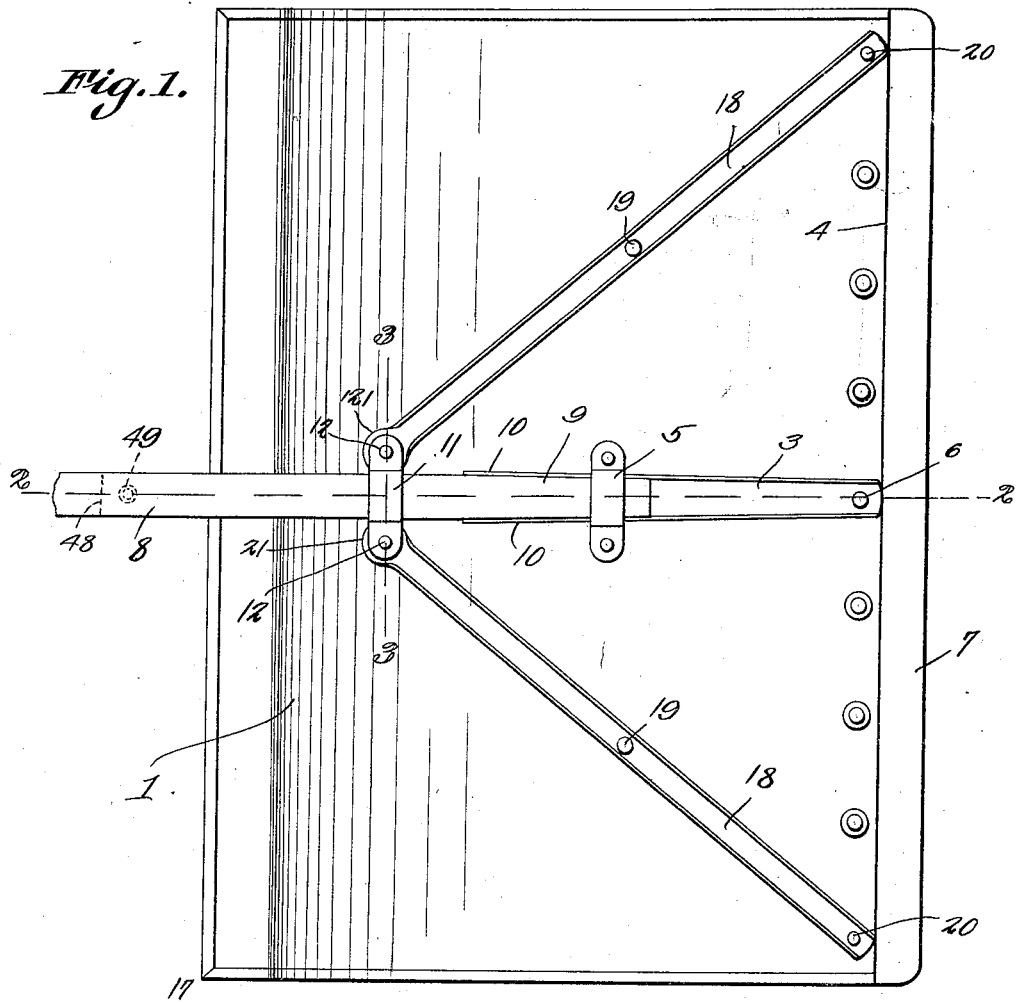
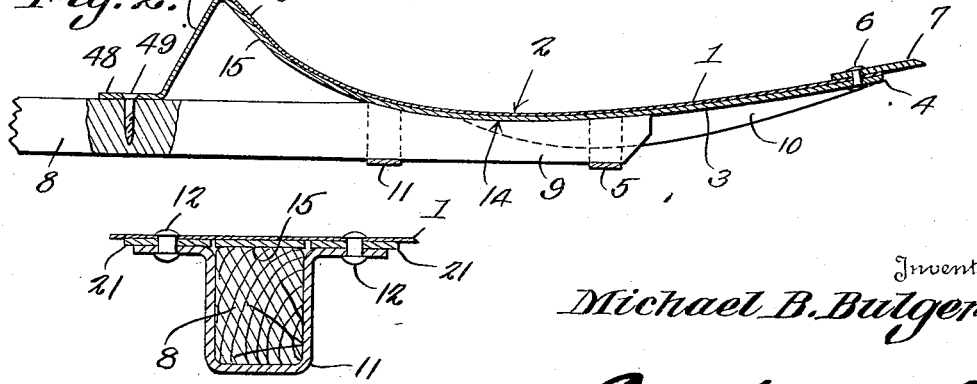
Inventor
Michael B. Bulger
By C.A. Snow & Co.
Attorneys.

Patented Mar. 15, 1932

1,849,171

UNITED STATES PATENT OFFICE

MICHAEL B. BULGER, OF BEAVER DAM, WISCONSIN

SNOW SHOVEL

Application filed March 7, 1931. Serial No. 520,930.

The device forming the subject matter of this application is an improvement on the snow shovel shown in my prior Patent No. 1,517,341. Since the novelty resides in certain structural features which distinguish the present shovel from the patented article, and since those features should be considered relatively to the patented article, the construction shown in the patent will be commented upon at some length, in order that the objects of the present invention may be clearly understood. Until notice of a change of purpose is given hereinafter, the numerals used are those to be found on the drawing of Patent No. 1,517,341.

In the patented snow shovel, the handle 11 is held on the body 4 to a large extent by a securing device 15, and a hole has to be made in the handle, for the reception of the securing device. It has been contended by some that this weakens the handle and causes it to break at the securing device 15, especially since the handle does not bear on the body above the securing device, and since there is no bracing connection between the handle and the upper portion of the body. This I propose to remedy by so constructing the improved shovel that there will be no weakening holes in its handle near to the place of attachment between the handle and the body, where the strain comes. The mere fastening of a shovel handle to a body, without perforating and weakening the handle, is not hard to accomplish, but to do this, and still keep the handle from pulling out endwise, is another matter, and is one of the objects of the present invention.

In the patented shovel, practically the entire connection between the handle 11 and the body 1 is near the geometrical center of the body, where the braces 5 and 6 and the socket 8 are located. This I propose to remedy by a new and better arrangement of braces and by a different construction and placing of the handle socket.

Passing from the old construction to the new, Figure 1 is a plan, Figure 2 is a section on the line 2—2 of Figure 1, and Figure 3 is a section on the line 3—3 of Figure 1.

The metal blade 1 of the shovel shown in the drawings of the present case, is convexed to form a crown about at the place where the numeral 2 is located in Figure 2. A trough-shaped socket 3 extends rearwardly from the extreme lower edge 4 of the blade 1, and is held in place by two members, one of which is a U-shaped lower clip 5, straddling the socket and secured to the blade. The other of said members may be a securing element 6, which also aids in holding the wear strip 7 on the blade 1. The socket 3 is curved to conform to the blade 1, and, therefore, has the crown shown at 2. The blade 1 and the socket 3 may be referred to as the body of the shovel, to which the wooden handle 8 is attached.

The handle 8 (which may be of any desired length) has a tapered end 9 wedged between the forwardly converging flanges 10 of the socket 3, and held in the socket by the forward U-shaped clip 5, which is secured at its ends to the blade. The handle 8 is further held on the blade 1 of the shovel by a rear U-shaped clip 11, the ends of which are fastened to the blade 1 by securing elements 12. It will be noted that the handle 8 is provided in its inner edge with a recess 14, in which the crown 2 of the body fits closely, and, therefore, the handle cannot be pulled out lengthwise, even though it is held in place by the U-shaped clips 5 and 11. Because it is unnecessary to make holes in the handle for securing elements, the handle is not weakened, that part of the handle which is in contact with the body of the shovel being imperforate.

At its rear end, the socket 3 has an extension 15 which, for reenforcement, extends through the rear clip 11, and backwardly along the part 16 of the blade 1 which diverges from the handle 8, and the rear or upper end of the extension 15 is formed into a prop 17, disposed at an angle to the handle, and terminating in a foot 48 attached by a securing device 49 to the handle. Rearwardly converging braces 18, preferably trough-shaped in cross section, are secured intermediate their ends to the blade 1, by fastening devices 19, the forward ends of the braces being attached to the blade by securing members 20, which engage both the blade 1 and the wear strip 7. The rear ends 21 of the braces 18 are flat, and are bound by the securing elements 12 between the blade 1 and the ends of the upper clip 11, as Figure 3 will show. The construction described in this paragraph distributes the strain, and does not localize it in one place, near to the geometrical center of the blade, as in my former patent, hereinbefore alluded to.

I claim:

A snow shovel comprising a handle and a blade, the rear portion of the blade slanting away from the handle, a trough-shaped socket on the blade, wherein the forward end of the handle is received, the socket being provided at its rear end with an extension which is prolonged backwardly along the rear portion of the blade, the extension terminating in an angularly-disposed prop secured to the handle, a forward clip straddling the socket and the forward end of the handle, and secured to the blade, a rear clip spaced from the forward clip and straddling the handle, the rear clip being secured to the blade, and braces extended along the blade toward the forward, outer corners of the blade, the braces being secured to the blade and to the rear clip.

In testimony that I claim the foregoing as my own, I have hereto affixed my signature.

MICHAEL B. BULGER.